United States Patent
Pentheroudakis et al.

(10) Patent No.: US 7,158,930 B2
(45) Date of Patent: Jan. 2, 2007

(54) METHOD AND APPARATUS FOR EXPANDING DICTIONARIES DURING PARSING

(75) Inventors: Joseph E. Pentheroudakis, Seattle, WA (US); Andi Wu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 776 days.

(21) Appl. No.: 10/219,752

(22) Filed: Aug. 15, 2002

(65) Prior Publication Data
US 2004/0034525 A1 Feb. 19, 2004

(51) Int. Cl.
G06F 17/21 (2006.01)
(52) U.S. Cl. ............................. 704/10; 704/9
(58) Field of Classification Search .................... 704/9, 704/10
See application file for complete search history.

(56) References Cited

U.S. PATENT DOCUMENTS

| | | | | |
|---|---|---|---|---|
| 5,029,084 A | * | 7/1991 | Morohasi et al. | 704/9 |
| 5,251,316 A | * | 10/1993 | Anick et al. | 707/101 |
| 5,991,713 A | * | 11/1999 | Unger et al. | 704/9 |
| 6,678,409 B1 | * | 1/2004 | Wu et al. | 382/177 |
| 2002/0152219 A1 | * | 10/2002 | Singh | 707/101 |
| 2005/0234709 A1 | * | 10/2005 | Klavans et al. | 704/10 |

OTHER PUBLICATIONS

C. Gdamiec et al., "Using Word Formation Rules to Extend MT Lexicons," 5th Conference of the Association for Machine Translation in the Americas, pp. 64-73 (Oct. 6, 12, 2002).
A. Wu et al., "Word Segmentation in Sentence Analysis," In Proceedings of the 1998 International Conference on Chinese Information Processing, Beijing, China (Nov. 18, 1998).
A. Wu et al., "Statistically-Enhanced New Word Identification in A Rule-Based Chinese System," In Proceedings of the Second ACL Chinese Processing Workshop, HKUST, Hong Kong (2000).
S. Thede et al., "Analysis of Unknown Lexical Items Using Morphological and Syntactic Information with the TIMIT Corpus," Fifth Workshop on Very Large Corpora., pp. 261-272 (1997).
C. Cardie, "A Case-Based Approach to Knowledge Acquisition for Domain-Specific Sentence Analysis," Proceedings of the Eleventh National Conference on Artificial Intelligence, pp. 798-803 (1993).

* cited by examiner

Primary Examiner—Tālivaldis Ivars Šmits
Assistant Examiner—Leonard Saint-Cyr
(74) Attorney, Agent, or Firm—Theodore M. Magee; Westman, Champlin & Kelly, P.A.

(57) ABSTRACT

A method is provided for parsing text in a corpus. The method includes hypothesizing a possible new entry for a dictionary based on a first segment of text. A successful parse is then formed for the first segment of text using the possible new entry. Based on the successful parse, the dictionary is changed to include the new entry. The new entry in the dictionary is then used to parse a second segment of text.

21 Claims, 4 Drawing Sheets

METHOD AND APPARATUS FOR EXPANDING DICTIONARIES DURING PARSING

BACKGROUND OF THE INVENTION

The present invention relates to natural language processing. In particular, the present invention relates to dictionaries used in syntactic parsing of text.

A natural language parser is a program that takes a text segment, usually a sentence, of natural language (i.e., human language, such as English) and produces a data structure, usually referred to as a parse tree. This parse tree typically represents the syntactic relationships between the words in the input segment.

The parsing process relies on a dictionary that enumerates morphological, syntactic, and semantic properties of words in a given language. Using the dictionary, the parser is able to segment text into individual words, identify a standardized form for each word (the lemma), and identify likely parts of speech for each word. This information is then used when constructing the parse tree.

Traditionally, dictionaries have been created by hand by one or more linguists. However, creating dictionaries in this manner is time consuming and labor intensive. To reduce the amount of work needed to create a dictionary or add new entries to an existing dictionary, a number of learning techniques have been developed that automatically build certain portions of the dictionary. However, each of these heuristics updates the dictionary in a separate phase, typically including manual review, after a full training corpus has been analyzed. In other words, the dictionary is not updated dynamically. Because of this, the dictionary is not as complete as would be desired.

SUMMARY OF THE INVENTION

A method is provided for parsing text in a corpus. The method includes hypothesizing a possible new entry for a dictionary based on a first segment of text. A successful parse is then formed for the first segment of text using the possible new entry. Based on the successful parse, the dictionary is changed to include the new entry. The new entry in the dictionary is then used to parse a second segment of text.

Under one embodiment, a second possible new entry is hypothesized from the second segment of text and a successful parse is formed with the new dictionary entry and the second possible new entry. Based on the successful parse, the dictionary is changed to include the second possible new entry.

DETAILED DESCRIPTION OF ILLUSTRATIVE EMBODIMENTS

Figure 1:
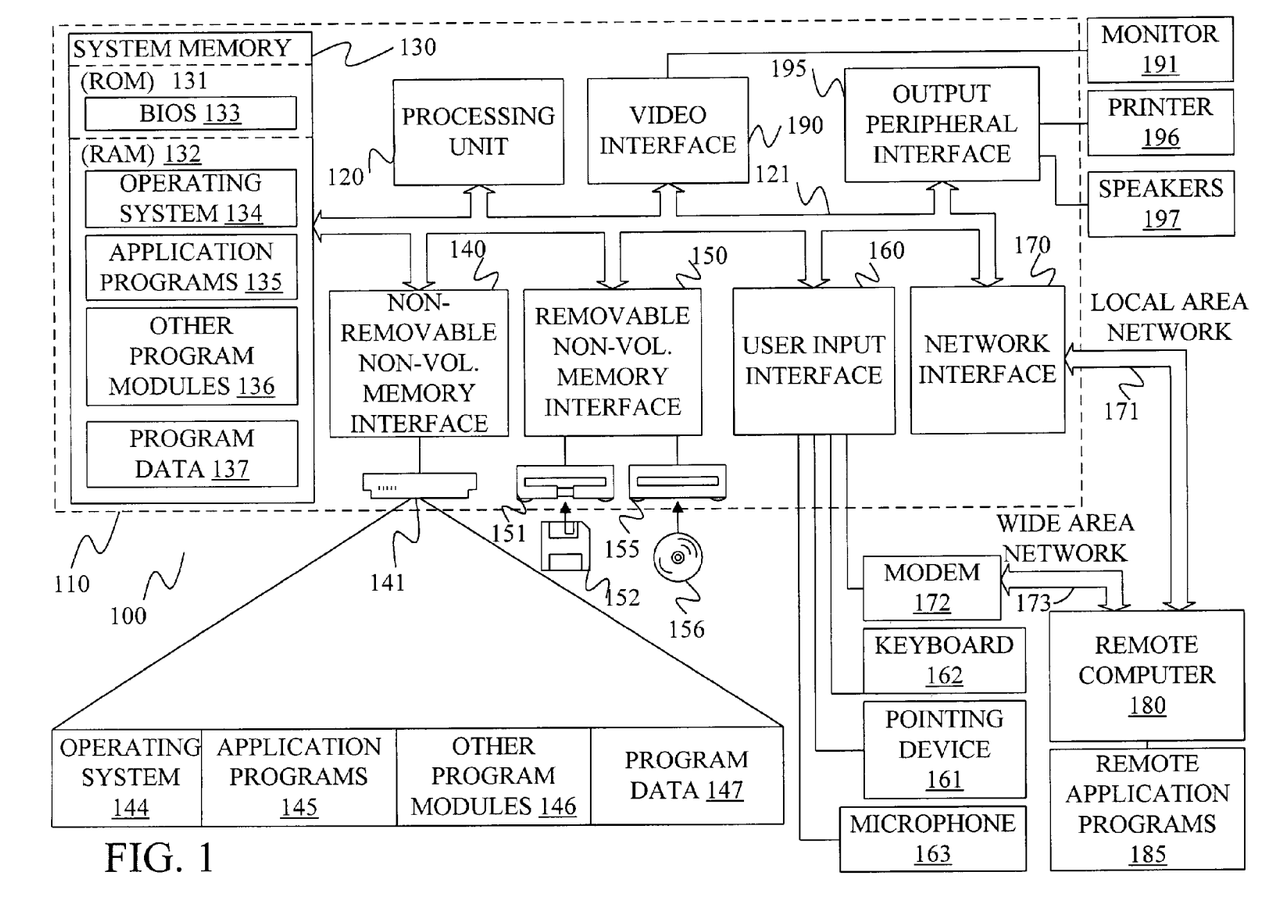
FIG. 1 is a block diagram of a general computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
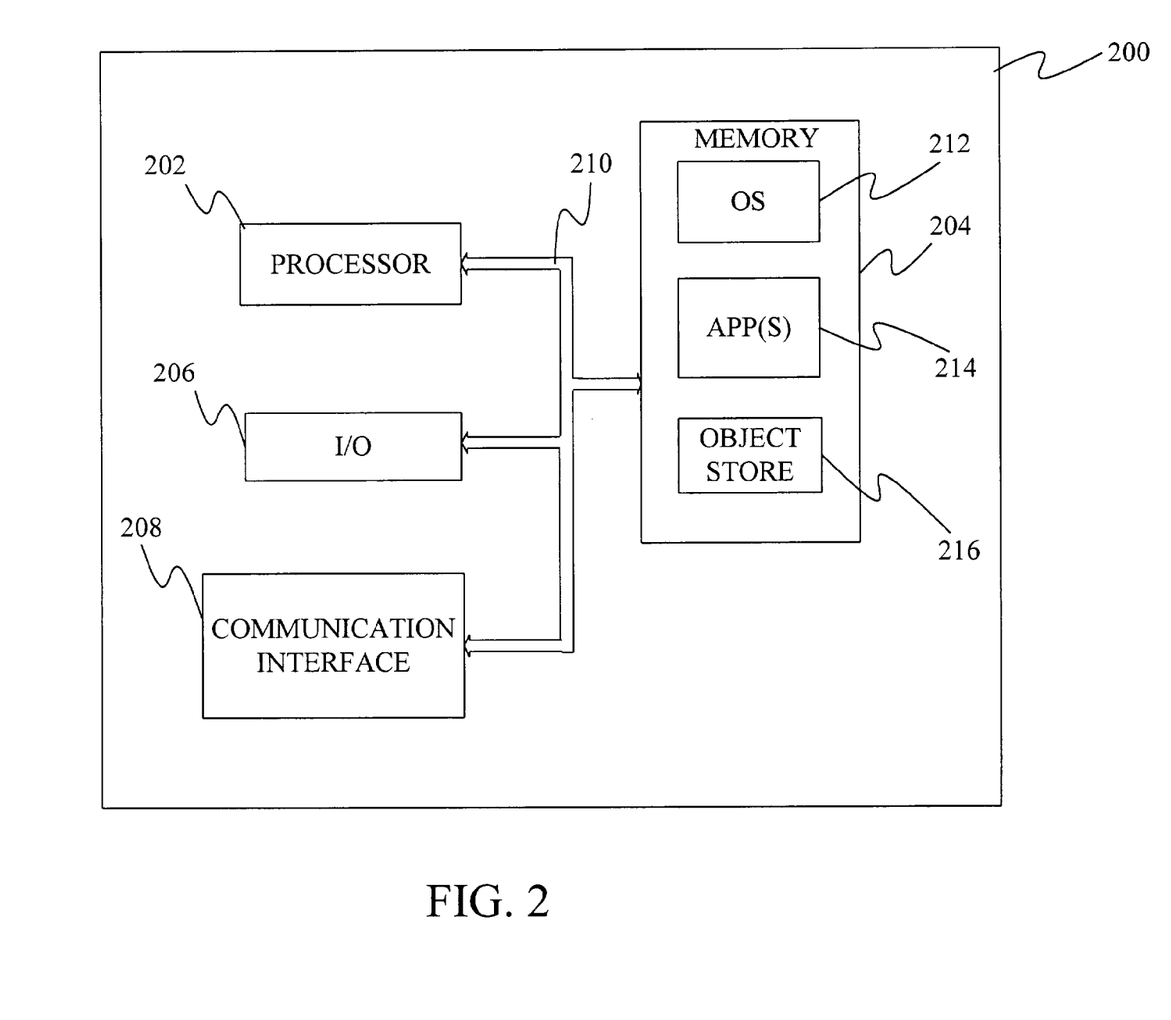
FIG. 2 is a block diagram of a mobile device in which the present invention may be practiced.

FIG. 2 is a block diagram of a mobile device 200, which is an exemplary computing environment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200 within the scope of the present invention.

The present invention provides a method of dynamically updating a dictionary used in natural language parsing. The method is described below with reference to the flow diagram of FIG. 3 and the block diagram of FIG. 4.

Figure 3:
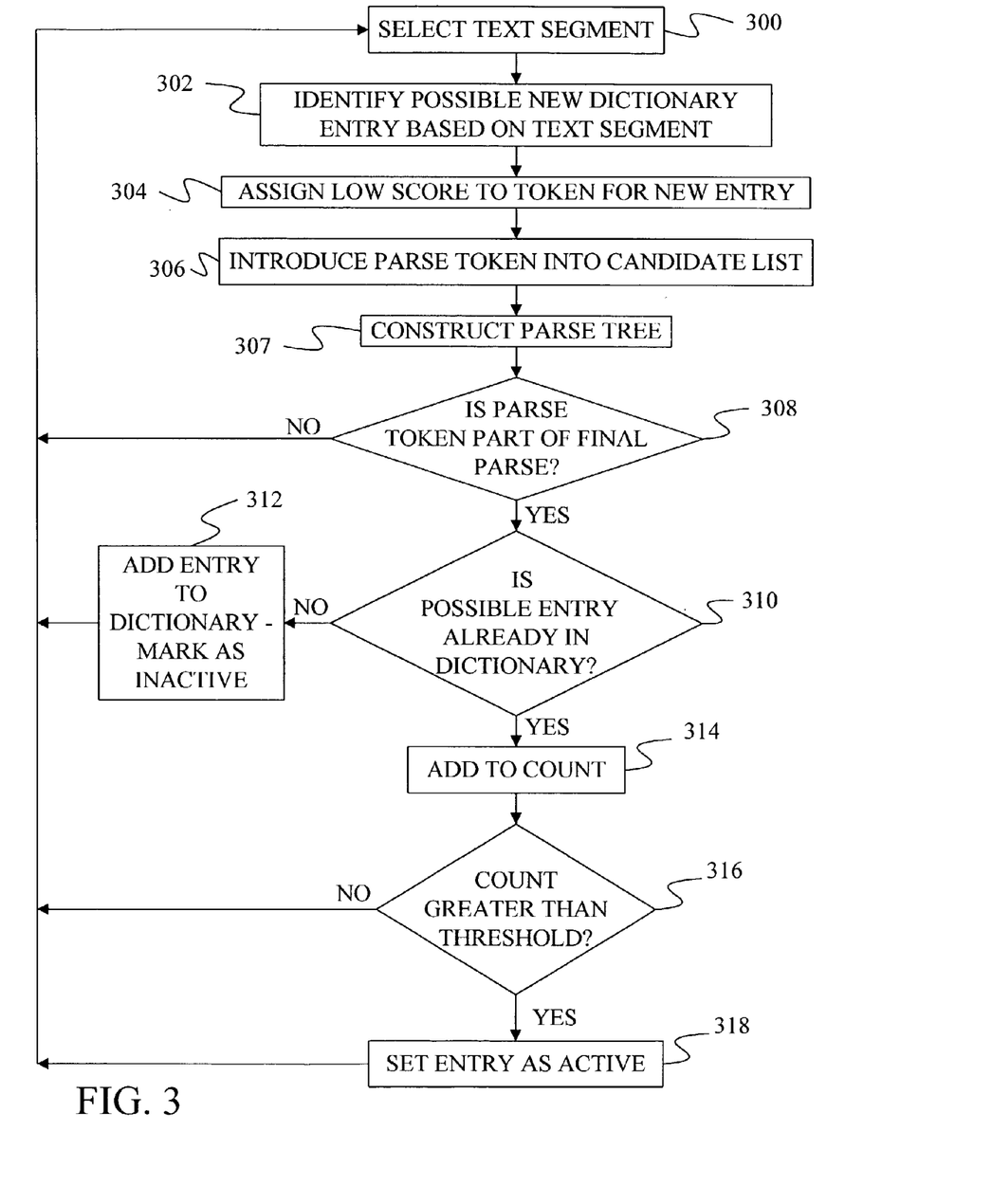
FIG. 3 is a flow diagram of a method of expanding a dictionary under an embodiment of the present invention.
Figure 4:
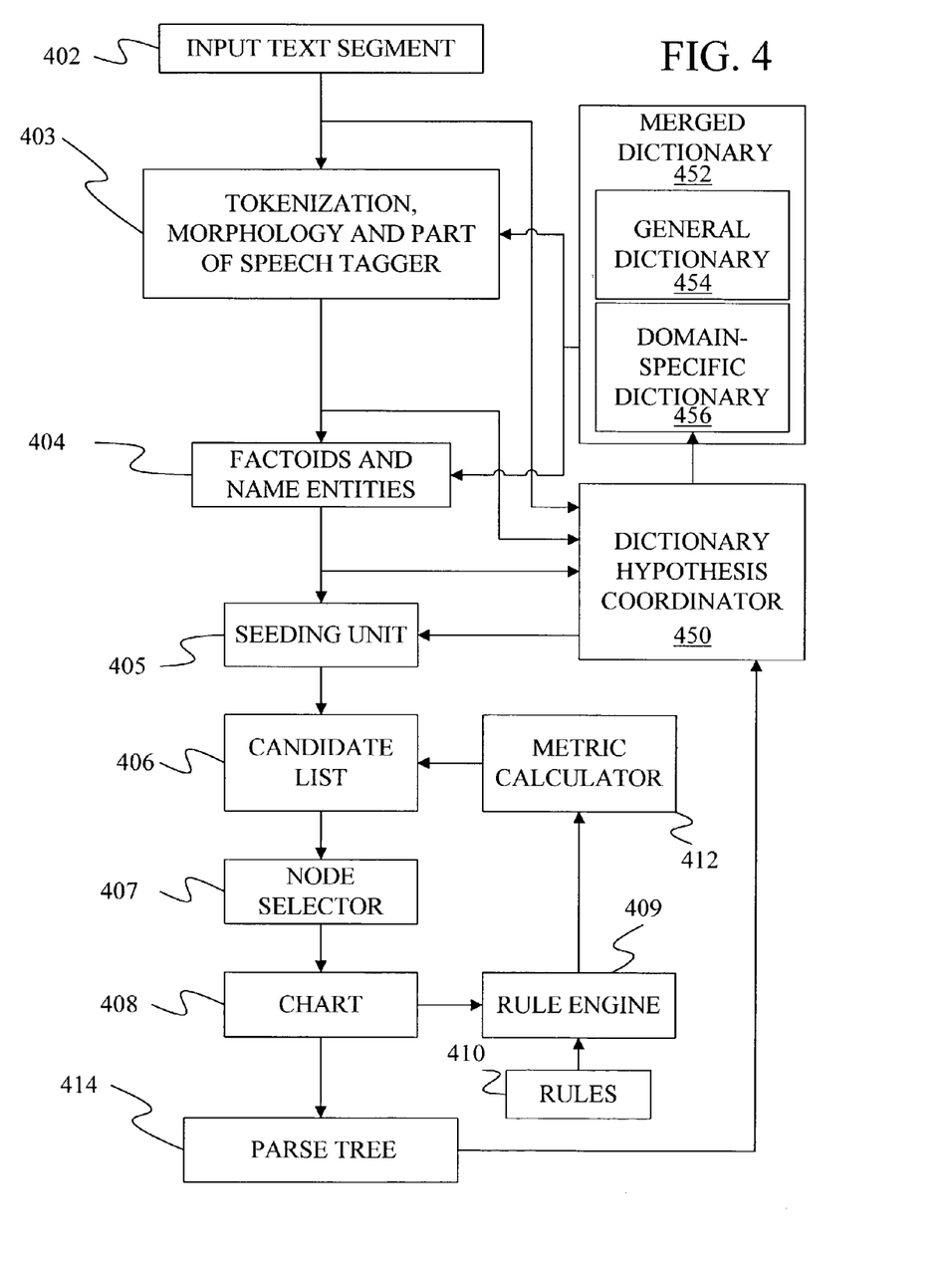
FIG. 4 is a block diagram of a parsing system under one embodiment of the present invention.

The process of FIG. 3 begins at step 300 where an input text segment 402 is received. Using the received text, a possible new dictionary entry is identified at step 302. Under the present invention, possible new dictionary entries are identified using one or more techniques associated with forming a parse tree and using a current form of a merged dictionary 452, which is a combination of a general dictionary 454 and a domain-specific dictionary 456.

Before the parse tree is constructed, individual words and phrases in the input text segment, as well as their possible parts of speech, are identified using a tokenization, morphology, and part-of-speech unit 403.

During tokenization, characters in the text are grouped into words and phrases. For most languages, this is achieved largely by looking for spaces between characters. However, for unsegmented languages, such as Chinese, tokenization involves determining whether groups of characters form valid words in the dictionary. Possible new entries for the dictionary are identified during tokenization by finding segmentations that meet the requirements of the language but that include words or word attributes that are not present in the dictionary.

For example, during tokenization of Chinese text, one embodiment of the present invention determines whether a single-character morpheme that is not listed as an independent word in the dictionary should be treated as a one-character word. This determination is based on things such as whether the character is subsumed by a multiple-character word in a possible segmentation and whether the morpheme appears in a given context.

In further embodiments, a determination is made as to whether combinations of characters that are not found to be words in the dictionary are possibly new words that should be added to the dictionary. Such combinations will be considered potential new words if there is a segmentation in which the combination of characters are not subsumed by other words, the joint probability of the characters being independent words is low, the internal structure of the new word conforms to word formation rules for the language, and the component characters have similar behavior in other words in the dictionary.

Morphological analysis involves determining the likely part-of-speech of a word and the arguments a word may take based on the shape of the word. For example, in English, a word that ends in "ing" is likely to be a verb. Under the present invention, possible new dictionary entries can be identified during morphological analysis. In particular, the form of a word can be used to hypothesize a new part-of-speech for the word.

Part-of-speech tagging looks at the general content of the text segment and makes determinations of likely parts-of-speech for words within the text segment based on the location of other words in the text. For example, a word may be considered a verb in Chinese if it is preceded by a modal or auxiliary verb, it is followed by an aspectual marker or it is preceded by an adverb or adverbial phrase. This type of analysis can be used under the present invention to hypothesize a new part-of-speech for a word.

After tokenization, morphology and part-of-speech tagging, a factoid unit 404 identifies factoids and named entities in the input text. These include things such as "Bill Gates", "London Bridge", and "Sep. 20, 1992", which represent a specific person, place or date. The structure of the text can indicate that some tokens are actually named entities. If a dictionary entry for those tokens is not present in merged dictionary 452 or if the entry does not indicate that those tokens represent a named entity, the present invention marks those tokens as such, creating a possible new entry in the dictionary.

In further embodiments of the invention, possible entries for the dictionary are identified by examining a parse tree 414 formed from the text segment and determining if tokens in the parse tree can be combined or redefined to improve the parse tree. If so, the combination of tokens or the new definition for a token can be presented as a possible new dictionary entry.

For example, the parse tree can be examined to determine if it includes multi-word phrases known as noun compounds. Such phrases include two or more words that together represent a single item. For example "dialog box", "mouse pointer", and "file name". To hypothesize a new possible noun compound, the parse tree is examined to see if there are any multi-word phrases that were parsed as a noun compound. If so, and the noun compound is not in the dictionary, it is identified as a possible new multi-word entry to be added to the dictionary.

Once a possible new dictionary entry has been identified at step 302, a parse token representing the new entry is provided to a seeding unit 405 by dictionary hypothesis coordinator 450. The token includes the word or words associated with the possible new entry and sub-categorization information such as the part of speech for the word and the arguments that the word can take. Tokens for the remainder of the text segment are provided by named entities unit 404, including tokens that represent alternatives to the tokens provided by hypothesis coordinator 450. Note that if a potential new part of speech for an existing word in the dictionary is being tested, a separate token is provided to seeding unit 405 for each part-of-speech.

Seeding unit 405 scores each token it receives to indicate the probability that the token will be in a final parse. To reduce the chances of introducing erroneous entries into the dictionary, seeding unit 405 assigns low scores to tokens provided by hypothesis coordinator 450 at step 304. This handicaps the proposed entry so that it will only appear in the final parse if other tokens are not available that provide a satisfactory parse. Each token and its score are then inserted in a candidate list 406 as starting nodes at step 306.

A parse tree is then constructed at step 307 through an iterative process. During each iteration, a single candidate node is promoted from candidate list 406 to a node chart 408 by a node selector 407. Typically this is done by promoting the node with the highest score first. The promoted node is then tested against rules in a rule grammar 410 by a rule engine 409 to see if the promoted node can be transformed into a higher level node using one of the rules. This can occur by applying a unary rule to the promoted node by itself or by applying a rule that combines the promoted node with one or more of the nodes in node chart 408.

During testing, the phrase types of the nodes under consideration are compared to the phrase types required by a rule. For example, a rule may take a verb phrase and a noun phrase to form a larger verb phrase. For such a rule, the promoted node and at least one other node in the node chart must provide the phrase types of noun phrase and verb phrase in order for the conditions of the rule to be satisfied. If the appropriate phrase types are not present in the node chart, the next rule in rule set 410 is examined.

Note that under some embodiments, the rules have additional conditions beyond the phrase types. For example, a rule may require number agreement (singular or plural) between a noun phrase and a verb phrase. In addition, the rule may require a particular phrase level for one or more of the constituent nodes.

When the node chart contains nodes that satisfy a rule, the rule is executed to form a new node. This execution includes determining a set of attributes that describe the structure of the node as well as attributes that define relationships found in the clause represented by the node. For example, the subject, object, indirect object, and lemma form of a head verb in a clause may be determined as well as the first token and last token spanned by the node.

The new node formed by executing the rule is then scored using a metric calculator 412. The score, if any, assigned to a node, is then used to determine which node to promote next to the chart. Any of a large number of different metrics may be used to score the node. For example, the frequency of the node type, the headword associated with the node, the phrase level of the node and the syntactic history of the node may all be used. One type of metric, known as a Statistical Grammar Metric (SGM), determines a score for the node based on probabilities associated with one or more of the factors listed above.

The scored node is inserted into candidate list 406. Under some embodiments, candidate list 406 is sorted based on the score of each node, so that the node with the highest score is at the top of the candidate list. At the beginning of the next iteration, this top-most candidate node is promoted to the node chart.

The iterations described above continue until one or more nodes are formed in node chart 408 that span the entire input segment. At least one of these final nodes is then selected as parse tree 414.

At step 308, dictionary hypothesis coordinator 450 examines parse tree 414 to determine if the token for the possible new dictionary entry forms a part of the parse tree. If it does not form a part of the parse tree, the entry is not added to the dictionary and the process returns to step 300, where the next text segment is selected.

If the token forms part of parse tree 414 at step 308, hypothesis generator 450 searches for the entry associated with the token in dictionary 452. Under some embodiments, the entry may be present in the dictionary but may not be active. This will occur if the entry has been used to form a final parse before but has not been used enough times to warrant its active entry in the dictionary. An entry that is not active is not used by the tokenization, morphology, part-of-speech or named entity units.

If the entry is not in the dictionary at step 310, it is added to the dictionary at step 312 and is marked as being inactive. After step 312, the process continues at step 300 where the next text segment is selected.

Under most embodiments of the invention, the entries are added to domain-specific dictionary 456. This allows for the automatic creation of specialized dictionaries that can be used to parse text associated with a specific domain such as medicine, computer-science, or politics. Depending on the text being processed, the appropriate domain-specific dictionary can be merged with a general dictionary that is used with all domains. During this merging, attributes in the domain-specific dictionary are given preference over attributes in the general dictionary. However, if the attributes do not conflict, the attributes in both the domain-specific and the general dictionary can be used during parsing.

If the entry is already in the dictionary, a count indicating the number of times the entry appeared in a final parse is incremented at step 314. At step 316, this count is compared to a threshold to determine if the entry has appeared in enough final parses to justify its active entry in the dictionary. If it has not appeared in enough parses, the entry remains inactive and the process returns to step 300. If the entry has appeared in enough parses, the entry is set as active at step 318 and the process returns to step 300.

Under one embodiment, different thresholds are used for different types of entries. In particular, if the entry represents a new word in the dictionary, the entry will have a lower threshold than if the entry represents a new attribute or sub-categorization for an existing word in the dictionary.

Note that after an entry is made active, it can be used during tokenization, morphology, part-of-speech tagging and named entity identification of the next text segment. Thus the dictionary is altered dynamically during the parsing of a corpus of text instead of waiting until after all text segments in the corpus have been parsed.

This provides an advantage to the present invention, because it allows the new entry to be used sooner thereby achieving better parses of the text in the current corpus and making it possible to hypothesize additional entries to add to the dictionary.

Dynamically adding the entry to the dictionary allows for better parsing because it allows the new entry to be identified in text segments that do not provide enough clues to guess at the possible existence of the entry. For example, if the best parse for a text segment includes a verb form of a particular word but the text segment does not provide enough contextual information to allow the verb form of the word to be identified, updating the dictionary to include an entry for the verb form of the word would make it possible to achieve the best parse for the text.

Dynamically updating the dictionary also allows more dictionary entries to be identified because it provides more information for analyzing text. In particular, updating the dictionary reduces the number of guesses that the parser must make in certain sentences. Since the tokens associated with each guess are given a low score when placed in the candidate list, reducing the number of guesses associated with a particular parse structure increases the likelihood that the parse structure will be formed. Thus, under the present invention, a newly added entry can be used to parse a sentence that includes another possible addition to the dictionary. Since the newly added entry will be given a higher score than a guessed entry when placed in the candidate list, it is more likely that a parse that includes the possible addition will be generated than if the newly added entry had not been placed in the dictionary. Thus, more possible additions to the dictionary will be identified by dynamically updating the dictionary as shown in FIG. 3 above.

Although the present invention has been described with reference to particular embodiments, workers skilled in the art will recognize that changes may be made in form and detail without departing from the spirit and scope of the invention.

What is claimed is:

1. A method of parsing text in a corpus, the method comprising:
   hypothesizing a possible new entry for a dictionary based on a first segment of a text;
   forming a successful parse of the first segment of said text using the possible new entry;
   changing the dictionary to include the new entry based on the successful parse by making an existing entry in the dictionary active; and
   using the new entry in the dictionary to parse a second segment of said text.

2. The method of claim 1 wherein hypothesizing a possible new entry comprises proposing a new word for a dictionary.

3. The method of claim 1 wherein hypothesizing a possible new entry comprises proposing a new attribute for an existing word in the dictionary.

4. The method of claim 1 wherein making an existing entry active comprises:
   increasing a count associated with the entry based on the successful parse;
   determining that the count exceeds a threshold; and
   making the existing entry active based on the count exceeding the threshold.

5. The method of claim 4 wherein determining that the count exceeds a threshold comprises selecting a threshold from a plurality of possible thresholds based on the entry.

6. The method of claim 1 wherein changing the dictionary comprises changing a domain-specific dictionary.

7. The method of claim 6 wherein using the new entry in the dictionary to parse the second segment comprises:
   merging the domain-specific dictionary with a general dictionary to form a merged dictionary; and
   using the merged dictionary to parse the second segment.

8. The method of claim 7 wherein merging the domain-specific dictionary and the general dictionary comprises designating attributes for a word in the merged dictionary such that some of the attributes come from the domain-specific dictionary and some of the attributes come from the general dictionary.

9. The method of claim 1 wherein using the new entry comprises:
   hypothesizing a second possible new entry based on the second segment of text;
   forming a successful parse with the new entry and the second possible new entry;
   changing the dictionary to include the second possible new entry.

10. A computer-readable medium having computer-executable instructions for performing steps comprising:
    hypothesizing a possible attribute for a word in a text segment, the possible attribute not being listed for the word in a dictionary used to form parse structures from text segments;
    creating a parse token based on the possible attribute for the word;
    using the parse token to form a parse structure for the text segment through steps comprising:
       creating a second parse token for the same word as the parse token;
       assigning a low score to the parse token relative to a score for the second parse token;
       making the parse token and the second parse token available for forming the parse structure;
       selecting the parse token instead of the second parse token when forming the parse structure;
    based on the parse token appearing in the parse structure, adding the possible attribute for the word to a dictionary used to form parse structures; and
    accessing the dictionary to retrieve the possible attribute for the word in the dictionary as part of forming a parse structure for second segment of said text.

11. The computer-readable medium of claim 10 wherein hypothesizing a possible attribute for a word comprises hypothesizing a part of speech for the word.

12. The computer-readable medium of claim 10 wherein adding the possible attribute to a dictionary comprises adding the possible attribute to a domain-specific dictionary.

13. The computer-readable medium of claim 12 wherein accessing the dictionary comprises accessing a merged dictionary formed by merging the domain-specific dictionary with a general dictionary.

14. The computer-readable medium of claim 10 wherein forming a parse structure for a second text segment comprises:
    hypothesizing a possible attribute for a second word, the possible attribute not being listed for the second word in a dictionary used to form parse structures;
    creating a parse token using the retrieved attribute;
    creating a second parse token based on the possible attribute for the second word;
    forming a parse structure that includes the parse token and the second parse token; and
    based on the second parse token appearing in the parse structure, adding the possible attribute for the second word to a dictionary.

15. A method of parsing a text having at least two sentences, the method comprising:
    parsing a first sentence of the text to form a first parse structure by using a dictionary to retrieve an attribute of a word in the first sentence;
    based on the first parse structure, dynamically modifying the dictionary to form a modified dictionary before parsing another sentence of the text; and
    using the modified dictionary to parse a second sentence of the text to form a second parse structure.

16. The method of claim 15 further comprising modifying the dictionary based on the second parse structure.

17. The method of claim 15 wherein modifying the dictionary comprises adding an entry to the dictionary based on an attribute of a token in the parse structure.

18. The method of claim 17 wherein the attribute is a part of speech.

19. A dictionary formed through a dynamic process that utilizes a corpus of text comprising at least two sentences, the process comprising:
    forming an initial dictionary;
    using the initial dictionary to parse a sentence in the corpus to form a first parse structure;

modifying the initial dictionary based on the first parse structure before parsing another sentence from the corpus to form the dictionary.

20. The dictionary of claim 19 wherein the dictionary is used to parse a second sentence in the corpus to form a second parse structure.

21. The dictionary of claim 20 wherein the dictionary is formed through a further process of modifying the dictionary based on the second parse structure before parsing another sentence from the corpus.

* * * * *